United States Patent [19]

Lipinski et al.

[11] Patent Number: 5,803,525

[45] Date of Patent: Sep. 8, 1998

[54] TAILGATE CONSTRUCTION

[75] Inventors: Paul Lawrence Lipinski, Plymouth; Terrance Dean Savitsky, Dearborn; Stacey Ann Boersma, Livonia, all of Mich.

[73] Assignee: Ford Global Technologies, Inc., Dearborn, Mich.

[21] Appl. No.: 784,331

[22] Filed: Jan. 16, 1997

[51] Int. Cl.[6] .................................................. B62D 33/03
[52] U.S. Cl. .......................................... 296/57.1; 410/112
[58] Field of Search ............. 296/57.1, 50; 410/112–114

[56] References Cited

U.S. PATENT DOCUMENTS

| | | | |
|---|---|---|---|
| 2,994,556 | 8/1961 | Sewelin et al. | 296/57.1 |
| 5,052,729 | 10/1991 | Huber | 296/57.1 X |
| 5,211,437 | 5/1993 | Gerulf | 296/61 |
| 5,378,094 | 1/1995 | Martin et al. | 410/112 |
| 5,468,114 | 11/1995 | Hickerson | 296/61 X |
| 5,518,286 | 5/1996 | McCormack | 296/57.1 |

FOREIGN PATENT DOCUMENTS 2167354  5/1986  United Kingdom ................... 410/113

*Primary Examiner*—Dennis H. Pedder
*Attorney, Agent, or Firm*—Daniel M. Stock

[57] ABSTRACT

A tailgate construction for a pickup truck provides a tailgate 28 having an attachment means consisting of the rod 44 extending laterally of the tailgate 28 between its side portions 36, 38. A pair of windows 46, 48 is formed through an inner surface 42 of the tailgate to provide access to the rod for purpose of anchoring tie down mechanism.

1 Claim, 1 Drawing Sheet

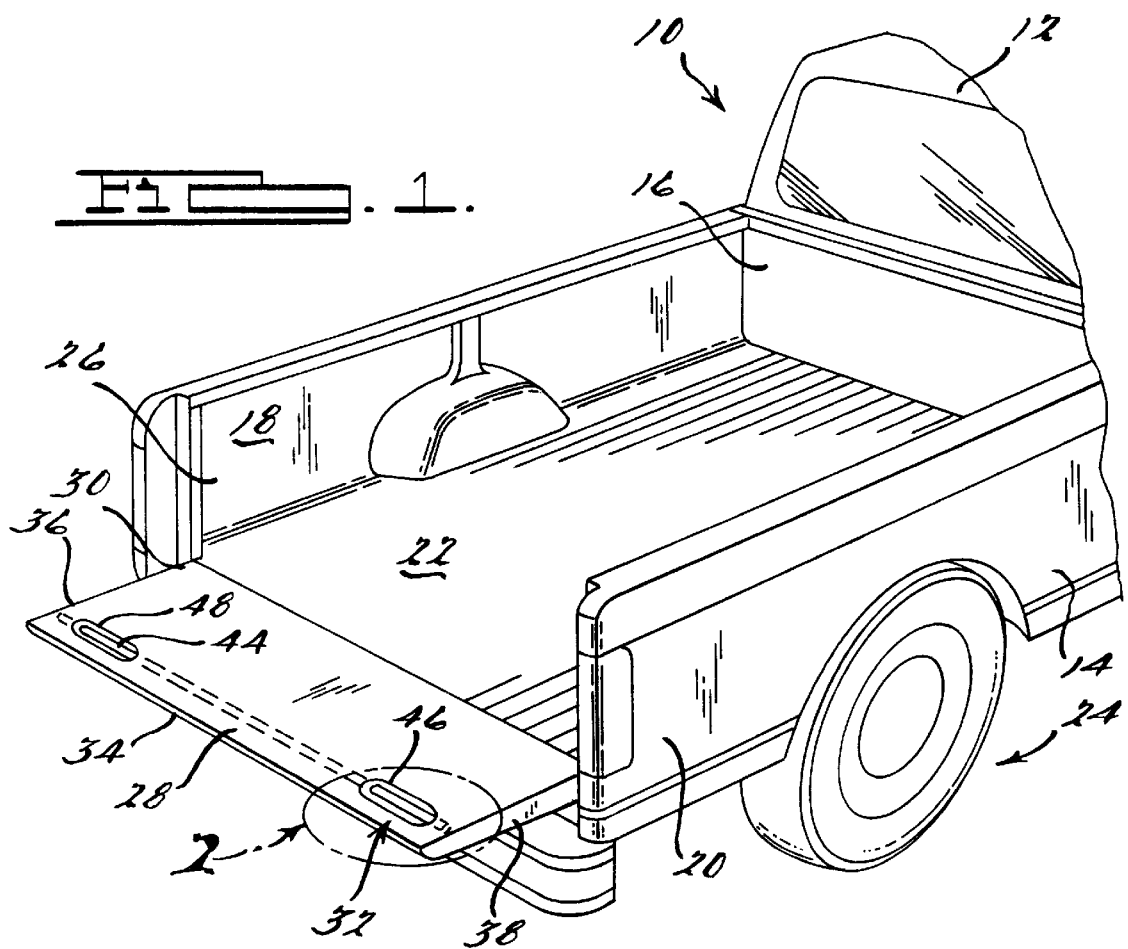
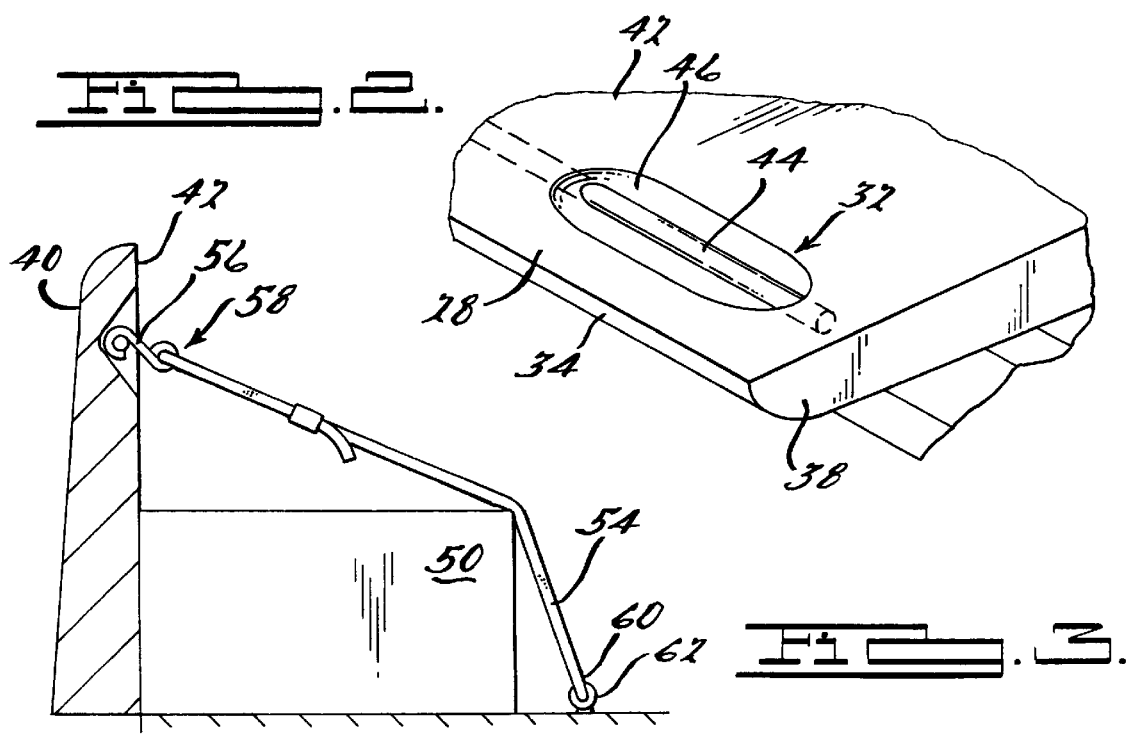

TAILGATE CONSTRUCTION

BACKGROUND OF THE INVENTION

1. Technical Field

The present invention relates generally to pick-up truck tailgates and more specifically to construction of such tailgates as they cooperate with the retention of loads within a pickup truck load bed.

2. Description of Related Art

It is well known in the automotive vehicle arts to provide utility vehicles referred to as pickup trucks which include a load bed position behind an operators cab which is bounded on its front by the cab or a panel positioned rearwardly of the cab and on its sides by a pair of longitudinally extending side panels and which leaves an opening at its rear end for slidable loading of articles in the load bed. This opening is conventionally selectably closable by a tailgate mechanism which is hingedly mounted to the side panels for pivotal movement between a vertical position closing the load box and a horizontal position opening the rear opening of the load box. Latching mechanisms of well known design are used to secure the tailgate in its upright or vertical position closing the load box.

Unless axially secured, articles placed in the load box which do not extend the full length of the box may undesirably slide fore and aft with respect to the load box. Various tie down mechanisms have been designed to secure such loads within the pick-up truck load box. It is often desirable however for convenience of loading and unloading to secure such a load adjacent the tailgate for ease of handling. It would be desirable to accommodate such particle retention in cooperation with the tailgate itself.

SUMMARY OF THE INVENTION

The aforementioned deficiencies in the prior art devices is met in a tailgate construction according to the present invention which provides a tailgate having an outer surface facing external the truck, an inner surface facing internal the truck and anchor means mounted between the inner and outer surface of the tailgate accessible from the tailgate inner surface for anchoring tie downs for accomplishing the fixing of articles with respect to the tailgate, particularly when the tailgate is in the vertical position.

According to a feature of the present invention, the anchor means is defined as at least one rod member mounted on the tailgate between the inner and outer surfaces of the tailgate.

According to another feature of the present invention, a pair of laterally spaced windows is formed through the tailgate inner surface in registration with the rod member to provide convenient access to the rod member.

BRIEF DESCRIPTION OF THE DRAWINGS

Other advantages and features of the tailgate construction of the present invention will be apparent to those skilled in the automotive vehicle arts upon reading the following description with reference to the accompanying drawings, in which:

FIG. 1 is a rear respective view of a pick-up truck showing a tailgate of the present invention in the open horizontal position;

FIG. 2 is an enlarged perspective view of anchor means of the invention tailgate construction; and FIG. 3 is a cross sectional view of the tailgate according to the present position in the upright closed position and operating to anchor an article adjacent to the tailgate.

DESCRIPTION OF THE PREFERRED EMBODIMENTS

Turning now to the drawings, particularly to FIG. 1 thereof, a pickup truck 10 is illustrated as including a cab 12, having a load box 14. The load box 14 is illustrated as having a front terminal wall 16 adjacent the rear of the cab 12. A pair of laterally spaced sidewalls 18, 20 extends rearwardly from the panel 16. A bed floor 22 extends laterally between the side walls and extends axially coextensively with them. The load box 14 is supported in conventional manner on the chassis of the pick-up truck indicated generally at 24. The opening 26 at the rear termination of the side walls 18, 20 this selectably closable by a tailgate 28 according to the present invention. The tailgate 28 is preferably pivotally mounted to the side walls 18, 20 about an axis approximate its slower edge indicated at 30 in FIG. 1. This pivotal mounting is well known in the art and further description is deemed unnecessary. Anchor means indicated generally at 32 is positioned proximate the upper edge 34 of the tailgate 28.

The tailgate 28 further includes side portions 36, 38 and includes an outer surface 40 facing external of the vehicle and an inner surface 42 that faces internal of the load box 14 of pickup truck 10 when the tailgate is in the upright position of FIG. 3.

The anchor means 32 is preferably formed as a rod 44 extending laterally between side portions 36, 38 of the tailgate 28. If the tailgate 28 is formed stampings or moldings defining box sections, the side portions 36, 38 may be in the form of rails and the rod 44 may be fixedly secured to each of them. Various other mechanical expedients for supporting the rod 44 between the side portion 36 and 38 may also be possible.

According to a preferred embodiment, a pair of windows 46, 48 are formed through the inner surface 42 of the tailgate 28 in registration with the rod 44 to permit access to the rod from the inner side of the tailgate 28.

In operation, when the tailgate 28 is pivotally moved from the horizontal position of FIG. 1 to the vertical position of FIG. 3, a position in which it may be latchably secured in a conventional manner, a strong anchor is presented to the interior of load box 14. If it is desired to secure an article such as a box indicated at 50 to the bed floor 22, a conventional elastic tie down cord 54 having a hooked end 56 may be inserted into the one or both of the windows 46, 48 to hook over the rod 44. Hook 56 is positioned at one end 58 of the tie down 54 while the other end 60 may be engaged with another anchor mechanism, indicated schematically at 62, secured to the bed floor 22. Various forms of eyelets and the like may be used and many are available in conventional truck construction. Robust anchors are not however conventionally provided in tailgates.

While only one embodiment of the present invention is disclosed, others may be possible without departing from the scope of the following claims.

We claim:

1. A tailgate for a truck having a pair of laterally spaced side walls extending rearwardly from a cab, terminating in rear ends and joined by a laterally extending bed floor, the tailgate being pivotally mounted with respect to the side walls for movement between a vertical closed position and a horizontal open position, and comprising:

first and second lateral side portions;

a substantially imperforate outer surface panel facing external of the truck;

a substantially imperforate inner surface panel facing internal of the truck;

a rod member having opposed ends fixedly secured to the first and second lateral side portions, mounted between the tailgate inner surface and the tailgate outer surface; and access window means formed in the tailgate inner surface to permit access to the rod member.

* * * * *